United States Patent
Tomino

(10) Patent No.: US 7,262,594 B1
(45) Date of Patent: Aug. 28, 2007

(54) ROTATION ANGLE DETECTOR

(75) Inventor: Yasunori Tomino, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/668,758

(22) Filed: Jan. 30, 2007

(30) Foreign Application Priority Data

| Mar. 24, 2006 | (JP) | ............................. 2006-082281 |
| Mar. 24, 2006 | (JP) | ............................. 2006-082282 |

(51) Int. Cl.
*G01B 7/30* (2006.01)

(52) U.S. Cl. ........................... 324/207.25; 324/207.21; 73/514.16; 73/514.31

(58) Field of Classification Search ........... 324/207.25, 324/207.21; 73/514.16, 514.31
See application file for complete search history.

(56) References Cited

U.S. PATENT DOCUMENTS

| 6,282,954 | B1 * | 9/2001 | Ott et al. ....................... 73/488 |
| 6,288,552 | B1 * | 9/2001 | Palmgren ..................... 324/505 |
| 6,724,186 | B2 * | 4/2004 | Jordil ..................... 324/207.21 |
| 6,804,888 | B2 | 10/2004 | Nishikawa et al. |
| 6,870,470 | B2 | 3/2005 | Nomura et al. |

FOREIGN PATENT DOCUMENTS

| JP | 2003-148949 | 5/2003 |
| JP | 2006-029792 | 2/2006 |

* cited by examiner

*Primary Examiner*—Bot LeDynh
(74) *Attorney, Agent, or Firm*—RatnerPrestia

(57) ABSTRACT

A rotation angle detector includes a rotator, a detecting rotator, a magnet, an anisotropic magnetoresistive element, an amplifier, and a controller. The controller connects an output terminal of the anisotropic magnetoresistive element to the ground so as to detect a short circuit between adjacent output terminals based on the difference in output voltage from the amplifier. When there is no short circuit, the controller releases the connection from the output terminal to the ground, and detects the rotation angle of the rotator from the output signal that is differentially amplified by the amplifier based on the output signal of the anisotropic magnetoresistive element.

8 Claims, 6 Drawing Sheets

US 7,262,594 B1

ROTATION ANGLE DETECTOR

BACKGROUND OF THE INVENTION

1. Field of the Invention

The present invention relates to a rotation angle detector mainly used for detecting a rotation angle of a steering wheel of an automobile.

2. Background Art

Automobiles are becoming increasingly functional in recent years. As a part of such a move, more and more automobiles are using a rotation angle detector to detect the rotation angle of the steering wheel for break control, skid control, and other purposes. A conventional rotation angle detector is described as follows with reference to FIGS. 6 and 7. FIGS. 6 and 7 are a perspective view and a block circuit diagram, respectively, of the conventional detector.

In the conventional rotation angle detector, rotator 31 is provided with spur gear 31A on its outer periphery and engaging portion 31B on its inner periphery. Engaging portion 31B is engaged with a steering wheel shaft (unillustrated) that is inserted into rotator 31. First detecting rotator 32 is provided on its outer periphery with spur gear 32A, and second detecting rotator 33 is provided on its outer periphery with spur gear 33A having a different number of teeth from spur gear 32A. Rotator 31 and first detecting rotator 32 are engaged with each other, and first and second detecting rotators 32 and 33 are engaged with each other. First and second detecting rotators 32 and 33 have magnet 34 and magnet 35, respectively, in their centers which are attached by insert molding or the like. Wiring board 36 is placed nearly parallel to the top surfaces of first and second detecting rotators 32 and 33, and is provided with a plurality of wiring patterns (unillustrated) on its top and bottom surfaces. Wiring board 36 is further provided with anisotropic magnetoresistive element (hereinafter, AMR element) 37 and AMR element 38 on its surface facing magnet 34 and magnet 35, respectively.

As shown in FIG. 7, AMR element 37 includes first Wheatstone bridge 41 and second Wheatstone bridge 42 each of which consists of four magnetoresistive elements 39 connected in a substantially rectangular shape. First and second Wheatstone bridges 41 and 42 are laid upon each other at an inclination of 45 degrees. Power supply terminals 41A and 42A are each derived from one of the four connection points of magnetoresistive elements 39 in each Wheatstone bridge and led to a power supply of 5V. Ground terminals 41B and 42B are each derived from the connection point that is diagonal to the aforementioned connection point and led to the ground.

Each of negative output terminals 41C and 42C and each of positive output terminals 41D and 42D are derived from the two other diagonal connection points of the four connection points and led to amplifier 43 on wiring board 36. Amplifier 43 has output terminals 43A and 43B connected to controller 44 formed of a microcomputer or the like. Note that AMR element 38 has the same structure as AMR element 37. In this manner, the rotation angle detector is structured.

Controller 44 in this type of rotation angle detector is connected to an electronic circuit (unillustrated) housed within the automobile main body through a connector (unillustrated) or the like.

In the aforementioned structure, when a steering wheel (unillustrated) is rotated with the ignition switch (unillustrated) on, rotator 31 starts rotation and causes first and second detecting rotators 32 and 33 to rotate in synchronization therewith.

The rotations of first and second detecting rotators 32 and 33 change the magnetic directions of magnets 34 and 35 attached in their centers. AMR elements 37 and 38 detect the changes. In the case of, for example, AMR element 37, negative output terminal 42C outputs a sine-wave signal to amplifier 43, and positive output terminal 42D outputs a sine-wave signal that is 90 degrees out of phase with the sine-wave signal of negative output terminal 42C to amplifier 43. On the other hand, negative output terminal 41C outputs a cosine-wave signal to amplifier 43, and positive output terminal 41D outputs a cosine-wave signal that is 90 degrees out of phase with the cosine-wave signal of negative output terminal 41C to amplifier 43. In other words, second Wheatstone bridge 42 of AMR element 37 outputs the sine-wave signals, and first Wheatstone bridge 41 at an inclination of 45 degrees from second Wheatstone bridge 42 outputs the cosine-wave signals in accordance with the magnetic direction of magnet 34 that changes with the rotation of first detecting rotator 32.

AMR element 38 outputs sine-wave signals and cosine-wave signals to amplifier 43 in the same manner as in the case of AMR element 37. However, second detecting rotator 33 is different from first detecting rotator 32 in the number of teeth. Therefore, the sine-wave and cosine-wave signals that are outputted to amplifier 43 have a phase different from the outputs of AMR element 37. Amplifier 43 differentially amplifies these sine-wave and cosine-wave signals and then outputs the amplified signals to controller 44.

Controller 44 calculates the signals and detects the rotation angle of rotator 31 from the rotation angles of first and second detecting rotators 32 and 33. As a result, controller 44 detects the rotation angle of the steering wheel. A rotation angle detector of this type is disclosed in Japanese Patent Unexamined Publication No. 2006-29792.

In the above-described rotation angle detector, however, when a conductive foreign matter such as metal powder enters and is present near AMR elements 37 and 38, an output terminal of amplifier 43 may output a signal that is not a sine wave or cosine wave. This can happen, for example, when a short circuit occurs between adjacent output terminals, such as between negative and positive output terminals 41C and 41D or between negative and positive output terminals 42C and 42D. Controller 44, however, cannot recognize this as an abnormal output signal.

When a short circuit occurs between such adjacent output terminals, the output signal has a waveform with a constant voltage. However, at a certain angle, the sine waveforms and the cosine waveforms have the same voltage as the constant voltage. Therefore, controller 44 cannot distinguish the sine-wave and cosine-wave output signals from the short circuit output signal, thereby causing erroneous detection of the rotation angle.

SUMMARY OF THE INVENTION

The rotation angle detector of the present invention includes a rotator, a first detecting rotator, a first magnet, a first anisotropic magnetoresistive element, an amplifier, and a controller. The first detecting rotator rotates in synchronization with the rotator. The first magnet is attached in the center of the first detecting rotator. The first anisotropic magnetoresistive element includes a first Wheatstone bridge and a second Wheatstone bridge, each of which consists of four magnetoresistive elements disposed facing the first magnet and connected in a substantially rectangular shape. The second Wheatstone bridge is at an inclination of 45 degrees with respect to the first Wheatstone bridge. The first Wheatstone bridge includes a first ground terminal, a first power supply terminal, a first positive output terminal, and a first negative output terminal. The second Wheatstone bridge includes a second ground terminal, a second power supply terminal, a second positive output terminal, and a second negative output terminal. The amplifier is connected to the first anisotropic magnetoresistive element so as to differentially amplify an output signal of the first anisotropic magnetoresistive element. When either the first positive output terminal or the first negative output terminal is a first output terminal, the controller connected to the amplifier connects the first output terminal to the ground so as to detect a short circuit between the first positive output terminal and the first negative output terminal based on the output voltage of the amplifier. The controller further releases the connection from the first output terminal to the ground, thereby detecting the rotation angle of the rotator based on the signal outputted from the amplifier in accordance with the output signal of the first anisotropic magnetoresistive element. The controller, which can thus detect a short circuit between output terminals, can accurately detect the rotation angle.

DETAILED DESCRIPTION OF THE INVENTION

First Embodiment

Figure 1:
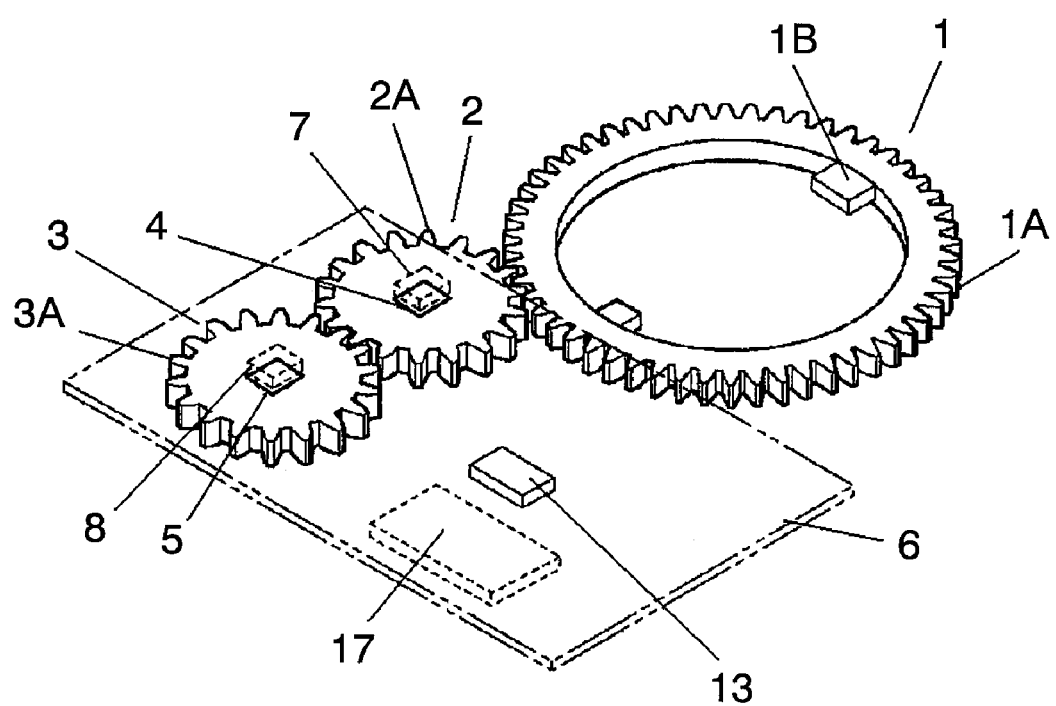
FIG. 1 is a perspective view of a rotation angle detector according to each embodiment of the present invention.
Figure 2:
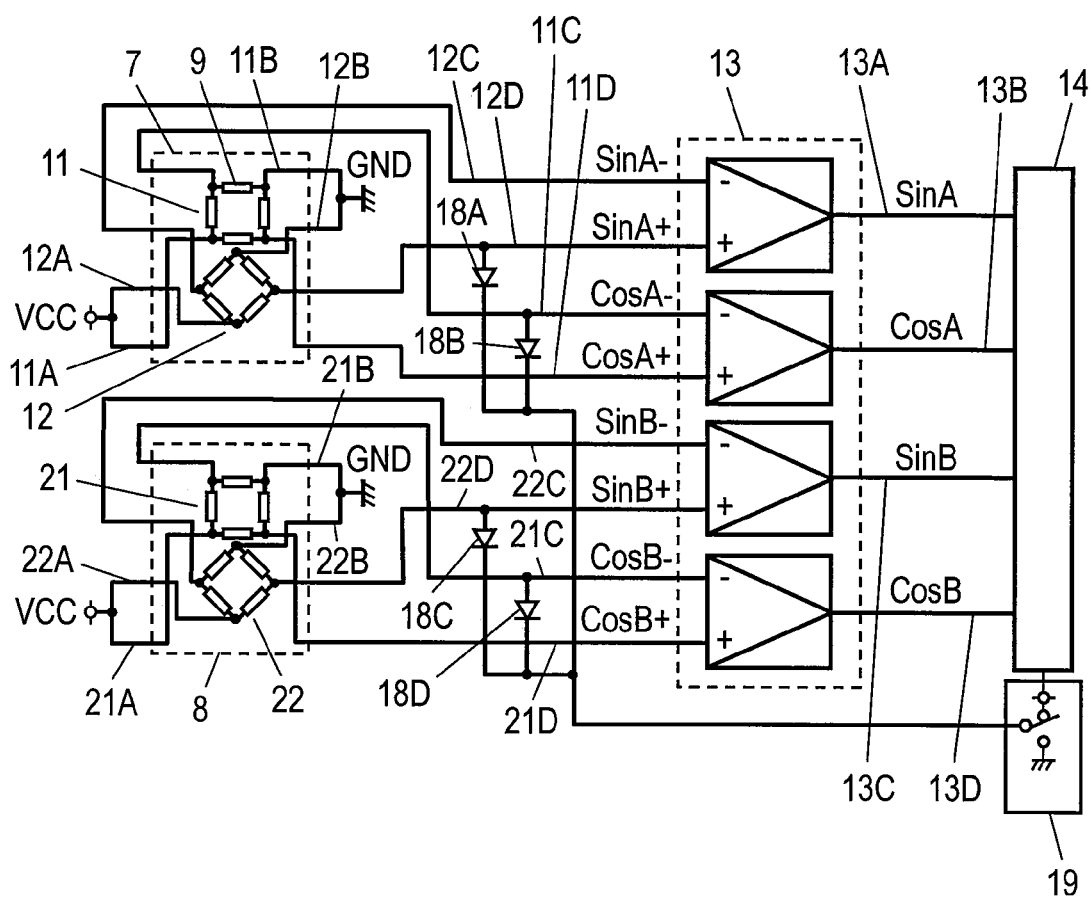
FIG. 2 is a block circuit diagram of a rotation angle detector according to a first embodiment of the present invention.

FIG. 1 is a perspective view of a rotation angle detector according to a first embodiment of the present invention. FIG. 2 is a block circuit diagram of the detector. The rotation angle detector includes rotator 1, first detecting rotator 2, and second detecting rotator 3. Rotator 1 is provided with spur gear 1A on its outer periphery and engaging portion 1B on its inner periphery. Engaging portion 1B is engaged with a steering wheel shaft (unillustrated) that is inserted into rotator 1. First detecting rotator 2 is provided on its outer periphery with spur gear 2A, and second detecting rotator 3 is provided on its outer periphery with spur gear 3A having a different number of teeth from spur gear 2A. Rotator 1 and first detecting rotator 2 are engaged with each other, and first and second detecting rotators 2 and 3 are engaged with each other. First and second detecting rotators 2 and 3 have magnet 4 and magnet 5, respectively, in their centers which are attached by insert molding or the like. Wiring board 6 is placed nearly parallel to the top surfaces of first and second detecting rotators 2 and 3, and is provided with a plurality of wiring patterns (unillustrated) on its top and bottom surfaces. Wiring board 6 is further provided with anisotropic magnetoresistive element (hereinafter, AMR element) 7 and AMR element 8 on its surface facing magnet 4 and magnet 5, respectively.

As shown in FIG. 2, AMR element 7 includes first Wheatstone bridge 11 and second Wheatstone bridge 12 each of which consists of four magnetoresistive elements 9 connected in a substantially rectangular shape. First and second Wheatstone bridges 11 and 12 are laid upon each other at an inclination of 45 degrees. First and second Wheatstone bridges 11 and 12, which are arranged vertically in FIG. 2 for easier understanding, are actually laid coaxially at an inclination of 45 degrees. First Wheatstone bridge 11 includes first power supply terminal 11A, first ground terminal 11B, first positive output terminal 11D, and first negative output terminal 11C. Second Wheatstone bridge 12 includes second power supply terminal 12A, second ground terminal 12B, second positive output terminal 12D, and second negative output terminal 12C.

First and second power supply terminals 11A and 12A are each derived from one of the four connection points of magnetoresistive elements 9 in each Wheatstone bridge and led to a power supply of 5V. First and second ground terminals 11B and 12B are each derived from the connection point that is diagonal to the aforementioned connection point of power supply terminals 11A and 12A and led to the ground.

Each of first and second negative output terminals 11C and 12C and each of first and second positive output terminals 11D and 12D are derived from the diagonal connection points other than the aforementioned connection points among the four connection points and led to amplifier 13 on wiring board 6. Amplifier 13 is made of electronic components such as transistors. Amplifier 13 has output terminals 13A and 13B connected to controller 14 formed of a microcomputer or the like.

In AMR element 7, the output terminals, which are arranged in alternating polarity such as positive output terminal 12D and negative output terminal 11C, are connected to switching portion 19 formed of an IO port or the like via first and second rectifier elements 18A and 18B, respectively. Rectifier elements 18A and 18B are composed of diodes or the like and connected to each other at the forward directions. Switching portion 19 is connected to controller 14. Note that switching portion 19 and rectifier elements 18A and 18B may be integrated into controller 14.

AMR element 8 with third Wheatstone bridge 21 and fourth Wheatstone bridge 22 has the same structure as AMR element 7. In other words, third Wheatstone bridge 21 includes third power supply terminal 21A, third ground terminal 21B, third negative output terminal 21C, and third positive output terminal 21D. Fourth Wheatstone bridge 22 includes fourth power supply terminal 22A, fourth ground terminal 22B, fourth negative output terminal 22C, and fourth positive output terminal 22D. Power supply terminals 21A and 22A are connected to the power supply, and ground terminals 21B and 22B are connected to the ground. Negative output terminals 21C and 22C, and positive output terminals 21D and 22D are connected to amplifier 13. The rotation angle detector of the present embodiment is structured in this manner.

First and second Wheatstone bridges 11 and 12 laid, for example, on a silicon wafer at an inclination of 45 degrees are covered with mold resin (unillustrated) made of insulating resin. The terminals extending at predetermined intervals from this mold are connected to amplifier 13, controller 14, and other components through the wiring patterns of wiring board 6 by soldering.

Controller 14 is connected to an electronic circuit (unillustrated) housed within the automobile main body through a connector (unillustrated) or the like. Engaging portion 1B of rotator 1 is engaged with a steering wheel shaft (unillustrated) that is inserted into rotator 1 so that rotator 1 can be attached to the automobile.

In the aforementioned structure, when a steering wheel (unillustrated) is rotated with the ignition switch (unillustrated) on, rotator 1 starts rotation and causes first detecting rotator 2 having spur gear 2A engaged with spur gear 1A and second detecting rotator 3 having spur gear 3A engaged with spur gear 2A to rotate in synchronization with rotator 1. The rotation of first detecting rotator 2 changes the magnetic direction of magnet 4, and the rotation of second detecting rotator 3 changes the magnetic direction of magnet 5. AMR elements 7 and 8 detect the respective changes.

Figure 3A:
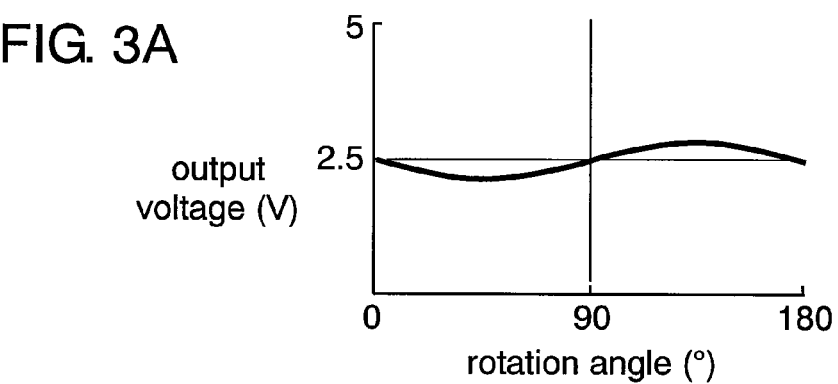
FIGS. 3A-3D are waveform diagrams of output voltages from anisotropic magnetoresistive elements shown in FIG. 2.
Figure 3B:
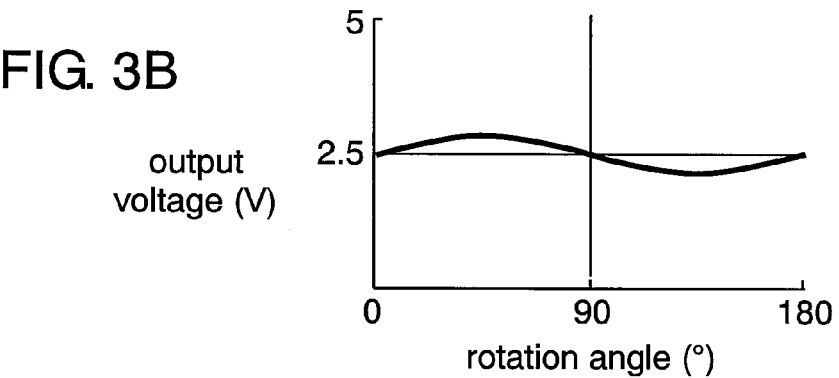

In AMR element 7 facing magnet 4, in second Wheatstone bridge 12, negative output terminal 12C outputs a signal shown in FIG. 3A, for example. This output signal is a sine wave with a voltage of about 2.4V to 2.6V. Positive output terminal 12D outputs a sine-wave signal shown in FIG. 3B. On the other hand, in first Wheatstone bridge 11, negative output terminal 11C outputs a cosine wave with a voltage of about 2.4V to 2.6V shown in FIG. 3C. Positive output terminal 11D outputs a cosine wave shown in FIG. 3D. These output signals are inputted to amplifier 13.

In this manner, Wheatstone bridge 12 outputs the sine-wave signals, and Wheatstone bridge 11 with an inclination of 45 degrees outputs the cosine-wave signals in accordance with the changes in the magnetic direction due to the rotation of magnet 4. Since switching portion 19 is switched on the power side at this moment, rectifier elements 18A and 18B become reverse-biased, and almost no current is going through them.

AMR element 8 outputs sine-wave signals and cosine-wave signals to amplifier 13 in the same manner as AMR element 7. However, the output signals of AMR element 8 differ in phase from those of AMR element 7 because of the difference in the number of teeth between first detecting rotator 2 with magnet 4 and second detecting rotator 3 with magnet 5.

Figure 4A:
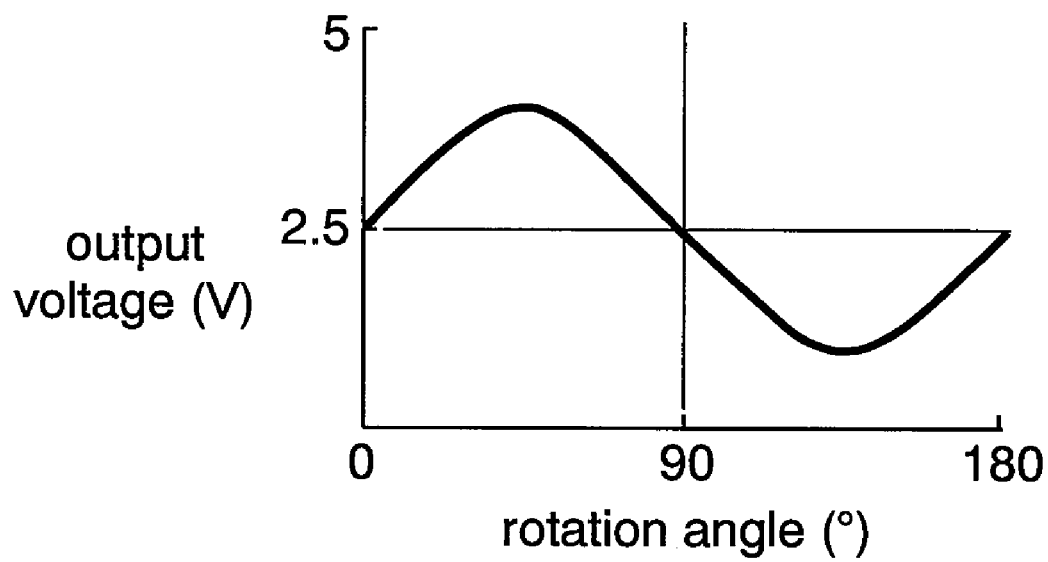
FIGS. 4A and 4B are waveform diagrams of output voltages from an amplifier shown in FIG. 2.
Figure 4B:
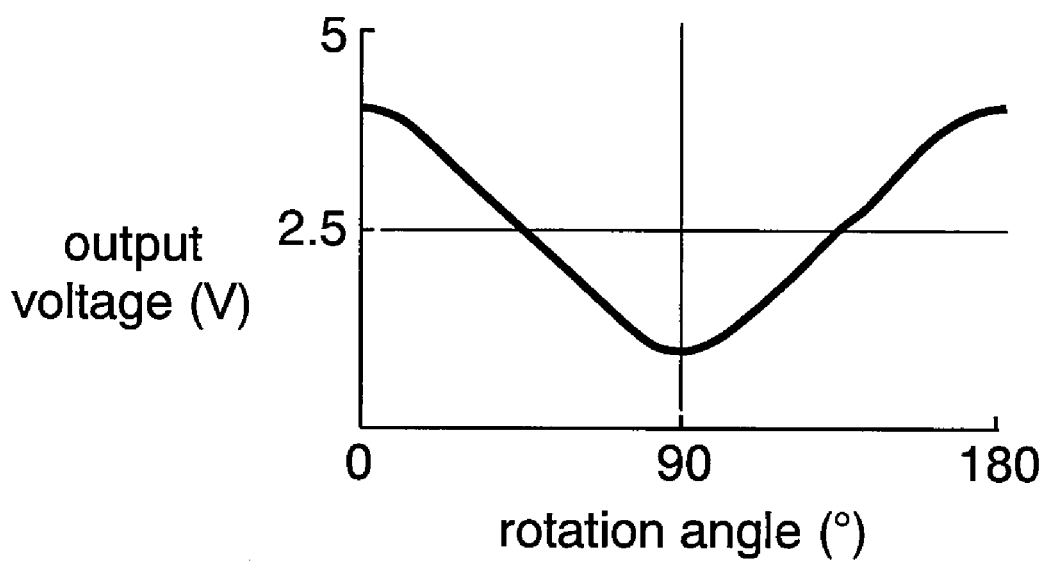

Amplifier 13 differentially amplifies these sine-wave and cosine-wave signals. For example, output terminal 13A outputs a sine wave with a voltage of about 1.5V to 3.5V shown in FIG. 4A. Output terminal 13B outputs a cosine wave shown in FIG. 4B. Output terminals 13C and 13D output signals having a phase difference from the signals of output terminals 13A and 13B. These output signals are inputted to controller 14.

Controller 14 calculates these sine-wave and cosine-wave output signals so as to determine the respective rotation angles of first and second detecting rotators 2 and 3, thereby detecting the rotation angle of rotator 1. As a result, controller 14 detects the rotation angle of the steering wheel. The calculation method used in controller 14 is disclosed, for example, in U.S. Pat. No. 6,870,470.

At a predetermined timing, for example, immediately after the ignition switch is turned on, controller 14 switches switching portion 19 to the ground side. Controller 14 thus applies current to rectifier elements 18A and 18B so as to detect the presence or absence of a short circuit between two adjacent output terminals.

When negative and positive output terminals 12C and 12D are not short circuited to each other, negative output terminal 12C outputs an output signal with a voltage of, for example, 2.6V to amplifier 13. On the other hand, positive output terminal 12D has a voltage of about 0.7V, which is the forward voltage of rectifier element 18A connected thereto. This is because rectifier element 18A is supplied with current when switching portion 19 is switched to the ground side. The output signal of positive output terminal 12D is outputted to amplifier 13.

Amplifier 13 differentially amplifies these output signals. More specifically, amplifier 13 subtracts the 2.6 V of negative output terminal 12C from the 0.7 V of positive output terminal 12D and amplifies the result dozen times or so. As a result, the voltage becomes negative several tens volts so as to saturate the output voltage after the differential amplification. As a result, output terminal 13A outputs 0 V to controller 14.

When short circuited to each other, negative and positive output terminals 12C and 12D thus connected to each other both output an output signal of 0.7V to amplifier 13. When amplifier 13 differentially amplifies these signals having the same voltage, the subtraction result becomes zero. As a result, output terminal 13A outputs a voltage of 2.5V to controller 14.

Controller 14 detects this voltage and determines negative and positive output terminals 12C and 12D not to be short-circuited when a voltage of 0V is inputted from output terminal 13A, and to be short-circuited when a voltage of 2.5V is inputted. When there is no short circuit, controller 14 switches switching portion 19 to the power side and then detects the rotation angle of the steering wheel. When there is a short circuit, the rotation angle detection signal can be prevented from being outputted to the electronic circuit housed within the automobile, for example.

Rectifier element 18B is connected to negative output terminal 11C so as to connect negative output terminal 11C to switching portion 19. Therefore, controller 14 can detect a short circuit between negative and positive output terminals 11C and 11D in the same manner as between negative and positive output terminals 12C and 12D. Furthermore, negative and positive output terminals 21C and 22D can be connected to switching portion 19 via fourth and third rectifier elements 18D and 18C, respectively, as shown in FIG. 2, so that a short circuit between these adjacent output terminals can be detected.

In other words, immediately after the ignition switch is turned on or at the other timing, controller 14 switches switching portion 19 to provide current to rectifier elements 18A, 18B, 18C and 18D. Controller 14 then detects a short circuit between adjacent output terminals depending on the difference in output voltage from AMR elements 7 and 8. As a result, controller 14 can accurately detect the rotation angle without any error.

Since positive and negative output terminals 12D and 11C connected to rectifier elements 18A and 18B, respectively, differ in polarity, a short circuit between output terminals 13A and 13B from amplifier 13 to controller 14 can be detected.

In a case that rectifier element 18A is connected to negative output terminal 12C, not to positive output terminal 12D as in the case of FIG. 2, when current is applied to rectifier elements 18A and 18B by switching switching portion 19, each of output terminals 13A and 13B outputs a voltage of 5 V to controller 14 if there is no short circuit therebetween. Each of output terminals 13A and 13B, however, outputs the voltage of 5V to controller 14 even if there is a short circuit therebetween. This makes it impossible for controller 14 to detect a short circuit between output terminals 13A and 13B.

In contrast, in the case shown in FIG. 2, output terminals opposite in polarity, such as negative and positive output terminals 11C and 12D, are connected to switching portion 19 via rectifier elements 18A and 18B. In this structure, when not short-circuited, output terminals 13A and 13B output a voltage of 0 V and a voltage of 5 V, respectively, to controller 14. When short-circuited, on the other hand, output terminals 13A and 13B each output a voltage of 2.5V to controller 14.

In other words, switching portion 19 is connected to the output terminals opposite in polarity of the two Wheatstone bridges via rectifier elements 18A and 18B. The difference in output voltage between the output terminals enables controller 14 to detect the presence or absence of a short circuit between output terminals 13A and 13B of amplifier 13 as well as the presence or absence of a short circuit between output terminals of the Wheatstone bridges.

In the same manner as in the case of AMR element 7, the two output terminals of the two Wheatstone bridges of AMR element 8 are opposite in polarity and connected to rectifier elements 18C and 18D and to switching portion 19. Therefore, controller 14 can also detect a short circuit between the output terminals of amplifier 13 based on the outputs of AMR element 8.

As described hereinbefore, the rotation angle detector of the present embodiment includes rotator 1, first detecting rotator 2, first magnet 4, AMR element 7, amplifier 13, and controller 14. First detecting rotator 2 rotates in synchronization with rotator 1. First magnet 4 is attached to the center of first detecting rotator 2. AMR element 7 includes first Wheatstone bridge 11 and second Wheatstone bridge 12, each of which consists of four magnetoresistive elements 9 disposed so as to face magnet 4 and connected in a substantially rectangular shape. Second Wheatstone bridge 12 is at an inclination of 45 degrees with respect to first Wheatstone bridge 11. Wheatstone bridge 11 includes first power supply terminal 11A, first ground terminal 11B, first negative output terminal 11C, and first positive output terminal 11D. Wheatstone bridge 12 includes second power supply terminal 12A, second ground terminal 12B, second negative output terminal 12C, and second positive output terminal 12D. Amplifier 13 is connected to AMR element 7 and differentially amplifies output signals from AMR element 7. When either first positive output terminal 11D or first negative output terminal 11C is a first output terminal, controller 14 connected to amplifier 13 connects the first output terminal to the ground, thereby detecting the presence or absence of a short circuit between positive and negative output terminals 11D and 11C. When there is no short circuit, controller 14 releases the connection from the first output terminal to the ground, and detects the rotation angle of rotator 1 based on signals outputted from amplifier 13 in accordance with output signals of AMR element 7. As a result, the rotation angle detector can accurately detect the rotation angle without any error.

Two output terminals opposite in polarity of the two Wheatstone bridges are preferably connected to switching portion 19 via rectifier elements. This structure can detect a short circuit between output terminals 13A and 13B of amplifier 13 as well as a short circuit between output terminals of the Wheatstone bridges.

In the present embodiment, rectifier elements 18A and 18B are connected to positive and negative output terminals 12D and 11C, respectively. Alternatively, these rectifier elements may be connected to positive and negative output terminals 11D and 12C. In other words, rectifier element 18B has only to be disposed between switching portion 19 and a second output terminal opposite in polarity to the first output terminal, and to be connected to switching portion 19 at the forward direction. The second output terminal is either positive or negative output terminal 12D or 12C. Controller 14 connects the first and second output terminals to the ground so as to detect a short circuit between output terminals of amplifier 13.

Similar to the case of AMR element 7, in AMR element 8, either third positive output terminal 21D or third negative output terminal 21C is a third output terminal, and controller 14 connects the third output terminal to the ground so as to detect a short circuit between positive and negative output terminals 21D and 21C.

Second Embodiment

Figure 5:
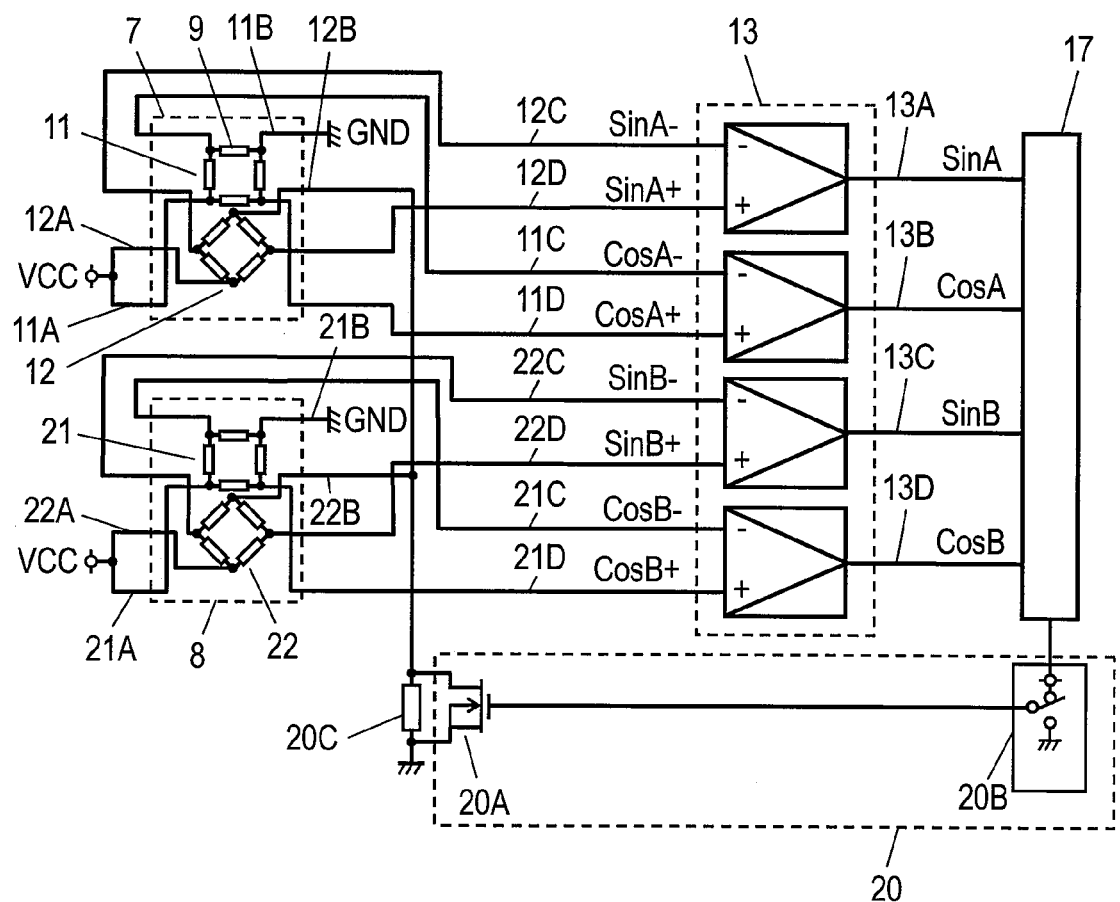
FIG. 5 is a block circuit diagram of a rotation angle detector according to a second embodiment of the present invention.
Figure 6:
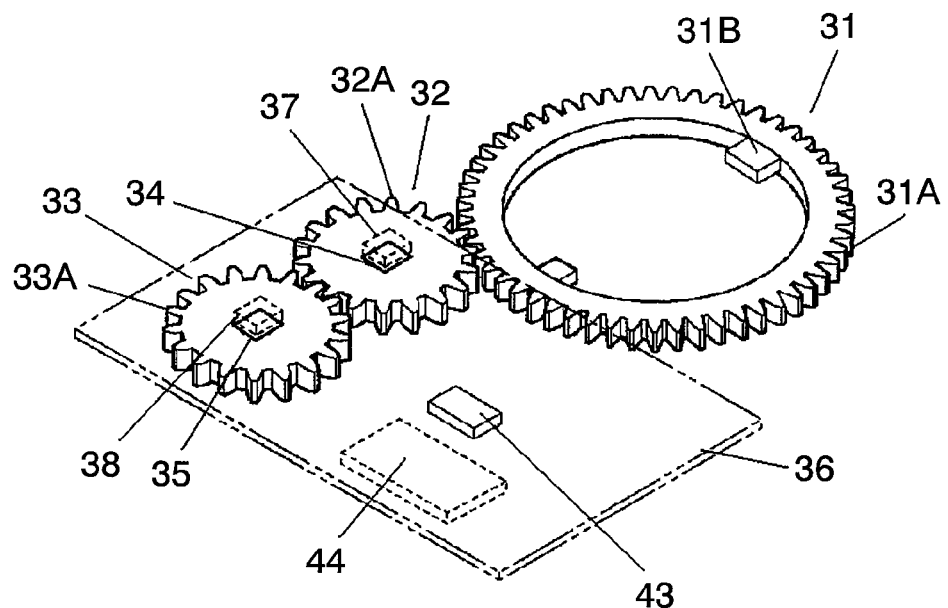
FIG. 6 is a perspective view of a conventional rotation angle detector.
Figure 7:
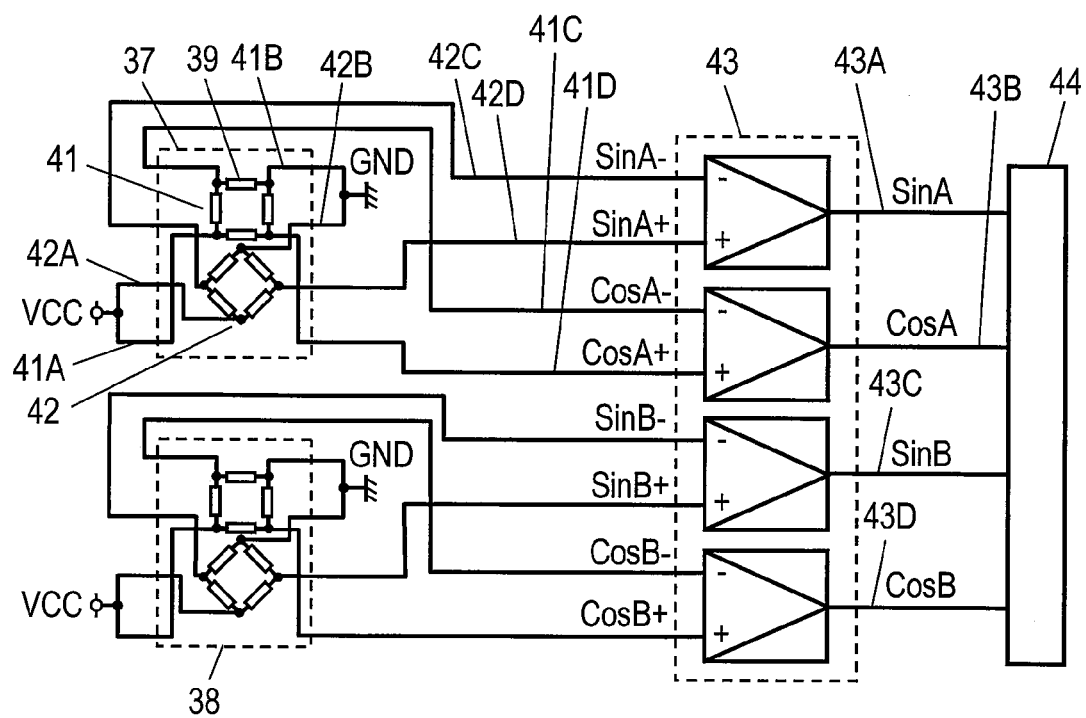
FIG. 7 is a block circuit diagram of the rotation angle detector shown in FIG. 6.

FIG. 5 is a block circuit diagram of a rotation angle detector according to a second embodiment of the present invention. The rotation angle detector according to the present embodiment is the same in structural configuration as, but different in circuit configuration from the detector according to the first embodiment described with reference to FIG. 1. The same components as those in the first embodiment may be referred to with the same numerals and symbols as those in the first embodiment and may not be described in detail.

As shown in FIG. 5, power supply terminals 11A and 12A each derived from a connection point in each of first and second Wheatstone bridges 11 and 12 of AMR element 7 are connected to a power supply of 5V. Ground terminal 11B is derived from the connection point that is diagonal to the aforementioned connection point from which power supply terminal 11A is derived in first Wheatstone bridge 11. Ground terminal 11B is connected to the ground.

On the other hand, ground terminal 12B derived from the connection point that is diagonal to the aforementioned connection point from which power supply terminal 12A is derived in second Wheatstone bridge 12 is connected to the ground via resistor 20C. Resistor 20C is connected in parallel to FET 20A or the other switching element, which is connected to IO port 20B and forms switching portion 20 together. In the same manner as in the first embodiment, each of negative output terminals 11C and 12C and each of positive output terminals 11D and 12D derived from the diagonal connection points other than the connection points of power supply terminals 11A and 12A among the four connection points are connected to amplifier 13. In the same manner as in the first embodiment, AMR element 8 has the same structure as AMR element 7.

The method of attaching the rotation angle detector thus structured to the steering wheel of the automobile and the method of detecting the rotation angle of the steering wheel will not be described again because they are the same as in the first embodiment. The following is a description of how to detect the presence or absence of a short circuit between the output terminals of each AMR element.

In the normal state, IO port 20B connects FET 20A and the power supply, thus FET 20A is on. Therefore, ground terminal 12B is connected to the ground. Controller 17 switches IO port 20B to the ground side, for example, immediately after the ignition switch is turned on, thereby turning FET 20A off. As a result, ground terminal 12B is connected to the ground via resistor 20C, which is applied with current.

Figure 3C:
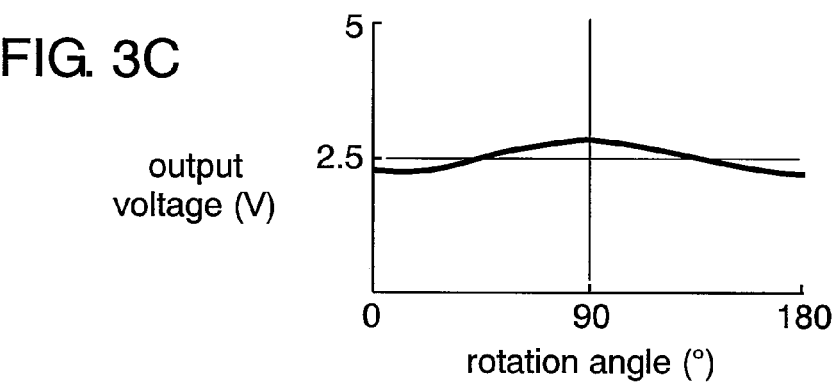
Figure 3D:
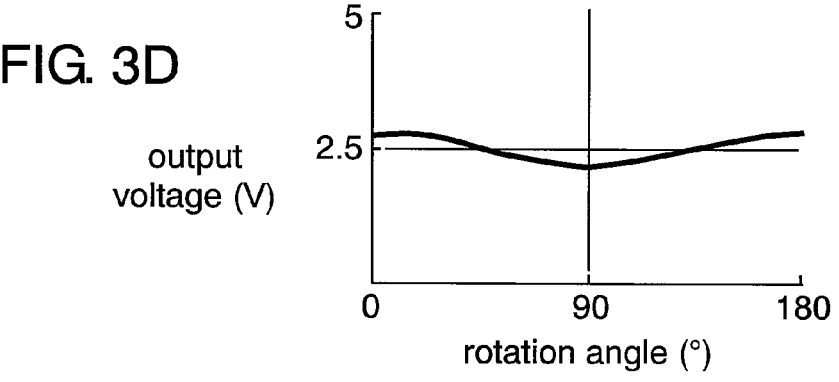

The following is a description of the case where there is no short circuit between output terminals of ARM element 7 or 8. For example, when there is no short circuit between negative output terminals 11C and 12C or between positive output terminals 11D and 12D, each of negative and positive output terminals 11C and 11D outputs a cosine-wave signal to amplifier 13. These output signals have the same waveform as shown in FIGS. 3C and 3D and a center voltage of 2.5V.

Each of negative and positive output terminals 12C and 12D also outputs a cosine-wave signal to amplifier 13. Each of the cosine-wave signals has a higher center voltage than the signals shown in FIGS. 3A and 3B by a voltage drop of resistor 20C and has smaller amplitude. More specifically, the center voltage of the output signals of negative and positive output terminals 12C and 12D changes from 2.5V to about 3.5V.

Then, amplifier 13 differentially amplifies these output signals, and output terminals 13A and 13B respectively output a sine-wave signal and a cosine-wave signal having a voltage to controller 17 in a normal output range.

In contrast, when there is a short circuit between negative output terminals 11C and 12C, each of these terminals outputs a signal to amplifier 13. The output signal has a voltage of about 3V obtained as a result of the synthesis of a sine wave and a cosine wave.

When amplifier 13 differentially amplifies the synthesized signal, output terminal 13A outputs a voltage of 5 V, which is the result of subtracting the 3 V of negative output terminal 12C from the 3.5 V of positive output terminal 12D and amplifying the resulting positive voltage. On the other hand, output terminal 13B outputs a voltage of 0 V, which is the result of subtracting the 3V of negative output terminal 11C from the 2.5V of positive output terminal 11D and amplifying the resulting negative voltage. These voltage outputs are inputted to controller 17.

Controller 17 detects these voltages and determines negative output terminals 11C and 12C not to be short-circuited when sine-wave and cosine-wave output signals are inputted from output terminals 13A and 13B, and to be short-circuited when voltages of 0V and 5V are inputted as output signals. When there is no short circuit, controller 17 switches IO port 20B to the power side, turns on FET 20A, and detects the rotation angle of the steering wheel. When there is a short circuit, the rotation angle detection signal can be prevented from being outputted to the electronic circuit housed within the automobile, for example.

In other words, immediately after the ignition switch is turned on or the other timing, controller 17 switches switching portion 20 to provide current to resistor 20C. Controller 17 then detects a short circuit between these output terminals depending on the difference in output signal from AMR element 7. As a result, controller 17 can accurately detect the rotation angle without any error.

In the same manner as between negative output terminals 11C and 12C, controller 17 can also detect a short circuit between negative and positive output terminals 11C and 12D; between positive and negative output terminals 11D and 12C; and between positive output terminals 11D and 12D of AMR element 7. Instead of ground terminals 12B and 22B connected via resistor 20C to the ground in the present embodiment, ground terminals 11B and 21B may be connected via resistor 20C to the ground. In other words, controller 17 switches switching portion 20 so as to switch ground terminal 11B or 12B from the state of being connected to the ground directly to the state of being connected to the ground via resistor 20C. As a result, controller 17 detects the presence or absence of a short circuit at least one of between positive output terminals 11D and 12D, between positive and negative output terminals 11D and 12C; between negative and positive output terminals 11C and 12D; and between negative output terminals 11C and 12C. When there is no short circuit, controller 17 switches switching portion 20 in such a manner that the ground terminal is connected directly to the ground. Controller 17 then detects the rotation angle of rotator 1 based on signals outputted from amplifier 13 in accordance with output signals of AMR element 7.

In the same manner as in the case of AMR element 7, the ground terminals, which are derived from the connection points diagonal to the connection points from which the power supply terminals are derived in fourth Wheatstone bridge 22, are connected to resistor 20C and FET 20A as shown in FIG. 5. As a result, a short circuit between each output terminal of AMR element 8 can be detected in the same manner as in AMR element 7.

As described above, in the present embodiment, the ground terminals of AMR elements 7 and 8 are connected to the ground via resistor 20C to which switching portion 20 is connected in parallel. Controller 17 detects the rotation angle of rotator 1 based on output signals of AMR elements 7 and 8, and then detects a short circuit between output terminals of AMR elements 7 and 8 by switching portion 20 and determining the difference between the output signals. As a result, controller 17 can accurately detect the rotation angle without any error.

In the aforementioned description, rotator 1 is engaged with first detecting rotator 2, and first detecting rotator 2 is engaged with second detecting rotator 3; however, rotator 1 could be alternatively engaged with both of first and second detecting rotators 2 and 3.

Furthermore, rotator 1, first detecting rotator 2, and second detecting rotator 3 are provided on their outer peripheries with respective spur gears engaged with each other to move in synchronization with each other. The spur gears, however, could be replaced by other gears such as bevel gears, or members other than gears such as irregularities or high-friction elements that can transmit rotation.

The rotation angle detector described above in each embodiment includes first and second detecting rotators 2 and 3, magnets 4 and 5 attached to detecting rotators 2 and 3, respectively, and AMR elements 7 and 8 disposed opposite to magnets 4 and 5, respectively. However, the structure of the present invention can be applied to a rotation angle detector not provided with second detecting rotator 3, magnet 5, and AMR element 8 as disclosed, for example, in Japanese Patent Unexamined Publication No. 2003-148949. Even in this case, it is possible to detect a short circuit between output terminals of AMR element 7.

As described hereinbefore, the rotation angle detector of the present invention can detect a short circuit between terminals of AMR elements, thereby accurately detecting the rotation angle. This rotation angle detector is useful for the detection of the rotation angle of the steering wheel of an automobile, for example.

What is claimed is:

1. A rotation angle detector comprising:
   a rotator;
   a first detecting rotator rotative in combination with the rotator;
   a first magnet attached in a center of the first detecting rotator;
   a first anisotropic magnetoresistive element including:

a first Wheatstone bridge and a second Wheatstone bridge each composed of four magnetoresistive elements connected to each other in a rectangular shape and disposed so as to face the first magnet, the second Wheatstone bridge being at an inclination of 45 degrees with respect to the first Wheatstone bridge, the first Wheatstone bridge including a first ground terminal, a first power supply terminal, a first positive output terminal, and a first negative output terminal; and the second Wheatstone bridge including a second ground terminal, a second power supply terminal, a second positive output terminal, and a second negative output terminal;

an amplifier connected to the first anisotropic magnetoresistive element, the amplifier being configured to differentially amplify an output signal from the first anisotropic magnetoresistive element; and a controller connected to the amplifier, wherein one of the first positive output terminal and the first negative output terminal is a first output terminal, the controller connects the first output terminal to a ground so as to detect a presence or absence of a short circuit between the first positive output terminal and the first negative output terminal, and when there is no short circuit, the controller releases connection from the first output terminal to the ground, thereby detecting a rotation angle of the rotator based on a signal outputted from the amplifier in accordance with the output signal of the first anisotropic magnetoresistive element.

2. The rotation angle detector according to claim 1, further comprising:

a first rectifier element electrically connected to the first output terminal; and a switching portion connected to the first rectifier element at a forward direction thereof, wherein the controller detects the presence or absence of the short circuit between the first positive output terminal and the first negative output terminal by switching the switching portion so as to connect the first output terminal to the ground.

3. The rotation angle detector according to claim 2, further comprising:

a second rectifier element disposed between the switching portion and a second output terminal and connected to the switching portion at a forward direction thereof, the second output terminal being one of a second positive output terminal and a second negative output terminal, the second positive output terminal and the second negative output terminal being opposite in polarity to the first output terminal, wherein the controller connects the first output terminal and the second output terminal to the ground, thereby detecting a presence or absence of a short circuit between output terminals of the amplifier.

4. The rotation angle detector according to claim 1, further comprising:

a second detecting rotator rotative in combination with one of the rotator and the first detecting rotator, the second detecting rotator being configured to rotate at a different speed from the first detecting rotator;

a second magnet attached in a center of the second detecting rotator;

a second anisotropic magnetoresistive element including:

a third Wheatstone bridge and a fourth Wheatstone bridge each composed of four magnetoresistive elements connected to each other in a rectangular shape and disposed so as to face the second magnet, the fourth Wheatstone bridge being at an inclination of 45 degrees with respect to the third Wheatstone bridge, wherein the amplifier is further connected to the second anisotropic magnetoresistive element, and differentially amplifies an output signal of the second anisotropic magnetoresistive element; and the controller detects a rotation angle of the rotator based on a signal outputted from the amplifier in accordance with the output signal of the first anisotropic magnetoresistive element and the output signal of the second anisotropic magnetoresistive element.

5. The rotation angle detector according to claim 4, wherein the third Wheatstone bridge includes a third ground terminal, a third power supply terminal, a third positive output terminal, and a third negative output terminal; the fourth Wheatstone bridge includes a fourth ground terminal, a fourth power supply terminal, a fourth positive output terminal, and a fourth negative output terminal;

one of the third positive output terminal and the third negative output terminal is a third output terminal; and the controller detects a presence or absence of a short circuit between the third positive output terminal and the third negative output terminal by connecting the third output terminal to the ground; and when there is no short circuit, the controller releases connection from the first output terminal to the ground and connection from the third output terminal to the ground, thereby detecting the rotation angle of the rotator based on the signal outputted from the amplifier in accordance with the output signal of the first anisotropic magnetoresistive element and the output signal of the second anisotropic magnetoresistive element.

6. A rotation angle detector comprising:

a rotator;

a first detecting rotator rotative in combination with the rotator;

a first magnet attached in a center of the first detecting rotator;

a first anisotropic magnetoresistive element including:

a first Wheatstone bridge and a second Wheatstone bridge each composed of four magnetoresistive elements connected to each other in a rectangular shape and disposed so as to face the first magnet, the second Wheatstone bridge being at an inclination of 45 degrees with respect to the first Wheatstone bridge, the first Wheatstone bridge including a first ground terminal, a first power supply terminal, a first positive output terminal, and a first negative output terminal; and the second Wheatstone bridge including a second ground terminal, a second power supply terminal, a second positive output terminal, and a second negative output terminal;

an amplifier connected to the first anisotropic magnetoresistive element, the amplifier being configured to differentially amplify an output signal of the first anisotropic magnetoresistive element;

a controller connected to the amplifier;

a resistor electrically connected between the first ground terminal and a ground; and a switching portion parallel with the resistor, wherein the controller switches the switching portion so as to switch the first ground terminal from a state of being connected to the ground directly to a state of being connected to the ground via the resistor, thereby detecting a presence or absence of a short circuit between at least one of:
   a) the first positive output terminal and the second positive output terminal,
   b) the first positive output terminal and the second negative output terminal,
   c) the first negative output terminal and the second positive output terminal, and
   d) the first negative output terminal and the second negative output terminal, and
   when there is no short circuit, the controller switches the switching portion in such a manner that the first ground terminal is connected to the ground directly, thereby detecting a rotation angle of the rotator based on a signal outputted from the amplifier in accordance with the output signal of the first anisotropic magnetoresistive element.

7. The rotation angle detector according to claim 6, further comprising:
   a second detecting rotator rotative in combination with one of the rotator and the first detecting rotator, the second detecting rotator being configured to rotate at a different speed from the first detecting rotator;
   a second magnet attached in a center of the second detecting rotator;
   a second anisotropic magnetoresistive element including:
      a third Wheatstone bridge and a fourth Wheatstone bridge each composed of four magnetoresistive elements connected to each other in a rectangular shape and disposed so as to face the second magnet, the fourth Wheatstone bridge being at an inclination of 45 degrees with respect to the third Wheatstone bridge, wherein
   the amplifier is further connected to the second anisotropic magnetoresistive element, and differentially amplifies an output signal of the second anisotropic magnetoresistive element; and
   the controller detects a rotation angle of the rotator based on a signal outputted from the amplifier in accordance with the output signal of the first anisotropic magnetoresistive element and the output signal of the second anisotropic magnetoresistive element.

8. The rotation angle detector according to claim 7, wherein the third Wheatstone bridge includes a third ground terminal, a third power supply terminal, a third positive output terminal, and a third negative output terminal; the fourth Wheatstone bridge includes a fourth ground terminal, a fourth power supply terminal, a fourth positive output terminal, and a fourth negative output terminal;
   the third ground terminal is electrically connected to a ground via the resistor;
   the controller switches the switching portion so as to switch the third ground terminal from a state of being connected to the ground directly to a state of being connected to the ground via the resistor, thereby detecting a presence or absence of a short circuit at least one of between the third positive output terminal and the fourth positive output terminal, between the third positive output terminal and the fourth negative output terminal, between the third negative output terminal and the fourth positive output terminal, and between the third negative output terminal and the fourth negative output terminal, and when there is no short circuit, the controller switches the switching portion in such a manner that the first ground terminal and the third ground terminal are connected to the ground directly, thereby detecting a rotation angle of the rotator based on the signal outputted from the amplifier in accordance with the output signal of the first anisotropic magnetoresistive element and the output signal of the second anisotropic magnetoresistive element.

* * * * *